Sept. 15, 1970   A. H. KELLER ET AL   3,528,231
MOWER CRUSHER WITH REEL SELECTIVELY POSITIONABLE
AND SELECTIVELY DRIVEN, BRAKED
AND FREE-WHEELING
Filed Jan. 2, 1968   3 Sheets-Sheet 3

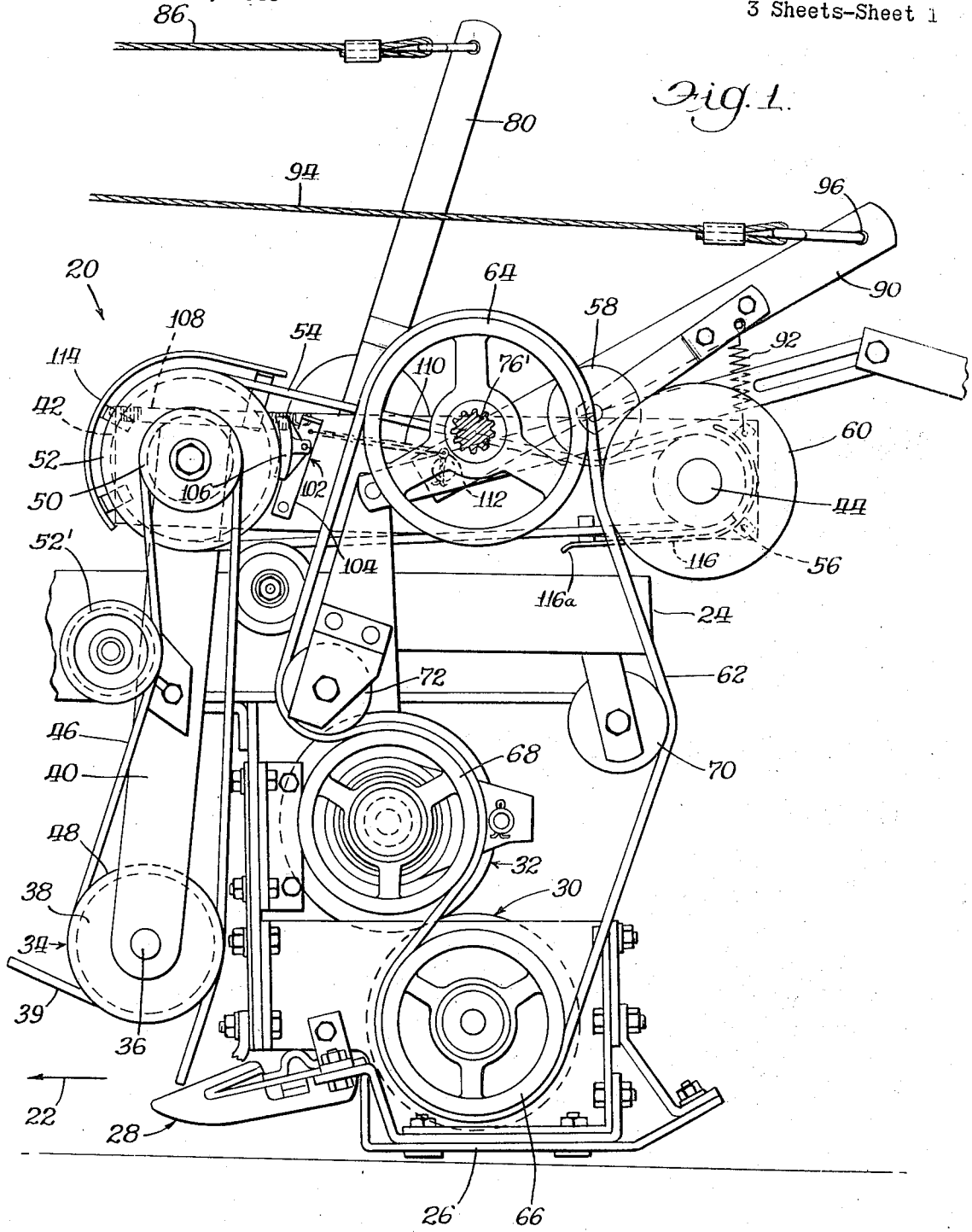

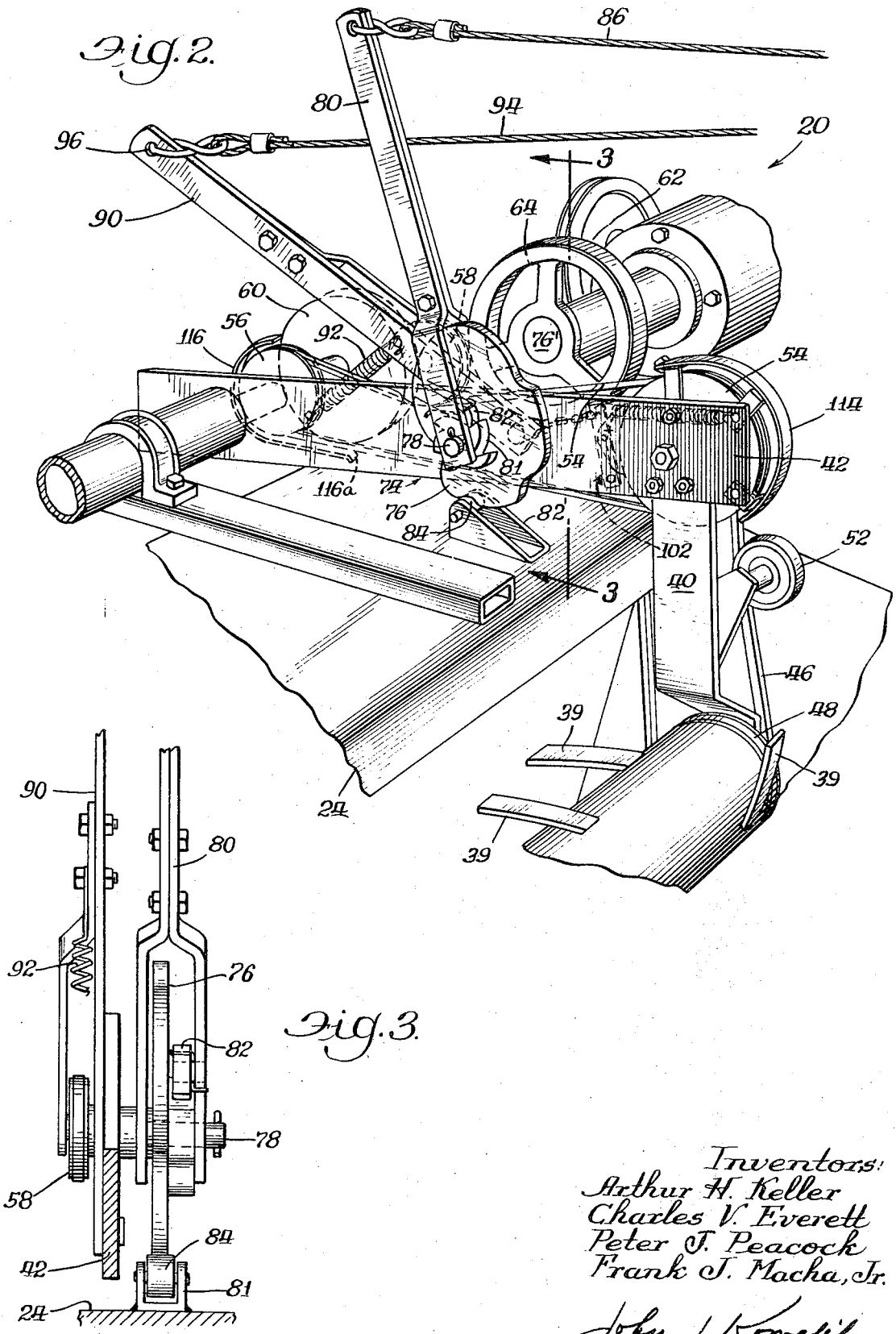

Inventors:
Arthur H. Keller
Charles V. Everett
Peter J. Peacock
Frank J. Macha, Jr.

John J. Kowalik
Atty.

United States Patent Office 3,528,231
Patented Sept. 15, 1970

3,528,231
MOWER CRUSHER WITH REEL SELECTIVELY POSITIONABLE AND SELECTIVELY DRIVEN, BRAKED AND FREE-WHEELING
Arthur H. Keller, Western Springs, Charles V. Everett, Warrenville, Peter J. Peacock, Western Springs, and Frank J. Macha, Jr., Chicago, Ill., assignors to International Harvester Company, Chicago, Ill., a corporation of Delaware
Filed Jan. 2, 1968, Ser. No. 694,951
Int. Cl. A01d 43/00
U.S. Cl. 56—23
12 Claims

ABSTRACT OF THE DISCLOSURE

Mower crusher with power driven reel located at the front, selectively positionable as to height and also selectively driven, braked and free-wheeling independently of vertical positioning.

CROSS-REFERENCES

This invention is an improvement over the invention disclosed and claimed in the co-pending application of Arthur H. Keller, et al., Ser. No. 603,307 now Pat. No. 3,488,513, filed Dec. 19, 1966, assigned to the assignee of the present invention.

BACKGROUND OF THE INVENTION

The invention resides in the broad field of mower crushers having a reel at the front for controlling the crop plants according to whether they are sparse or thick, tall or short, etc., the reel being positioned vertically and driven or braked or free-wheeling for so controlling them.

SUMMARY OF THE INVENTION

A broad object of the invention is to provide a mower crusher of the foregoing general character wherein the reel is selectively positionable vertically and, independently thereof, selectively driven, braked or free-wheeling.

Another object is to provide a device of the foregoing general character of novel construction including convenient and easily manipulable control means for the essentially vertical positioning and the driving, braking, and free-wheeling of the reel.

An additional object is to provide a device of the foregoing character that is of extremely simple construction and effective in operation.

Still another object is to provide a device of the foregoing character having belt and pulley drive arrangement utilized in driving the reel and including novel shield means for controlling the belt means and thereby providing novel clutching effect between the belt means and pulley means for establishing and controlling driving and non-driving relation therebetween.

DESCRIPTION OF A PREFERRED EMBODIMENT OF THE INVENTION

FIG. 1 is a side elevational view of the principal operating parts of a mower crusher, and including certain principal components of the inventive structure applied thereto;

FIG. 2 is a perspective view oriented according to the top left of FIG. 1 and looking generally downwardly, from the side opposite that shown in FIG. 1;

FIG. 3 is a detail view taken on line 3—3 of FIG. 2;

Figure 4:
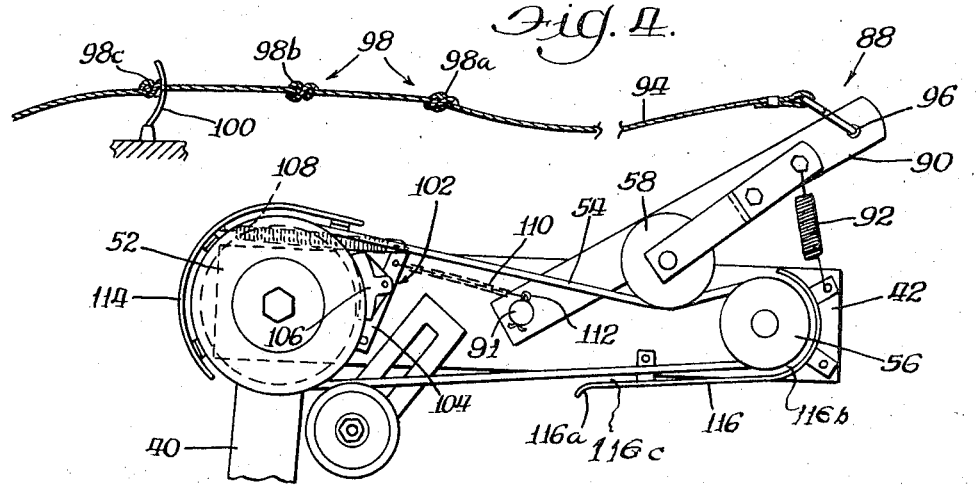
FIG. 4 is an isolated detail view of the principal components of the present invention oriented according to FIG. 1 and showing certain elements shown in the uppermost portion of the latter figure.

Referring now in detail to the accompanying drawings, attention is directed first to FIGS. 1 and 2 which show certain components of a forage or crop harvester of the type to which the present invention is applied. The harvester illustrated is a mower-crusher of the kind disclosed in the co-pending patent application identified above, indicated generally at 20; it is arranged for moving along the ground in the direction of the arrow 22, and includes a framework indicated generally at 24. The framework includes an element 26 adapted to ride on the ground, and the implement includes a cutter means 28 which in the present instance is a sickle cutter extending across the width intended to be the swath to be cut.

Rearwardly of the sickle or cutter is a pair of rollers 30, 32, of known type which receive therebetween the cut crop plants immediately upon being cut and crush them and deliver them rearwardly to another instrumentality, or to the ground.

Associated with the sickle cutter 28 and the crusher rollers 30, 32 is a reel 34 in itself of known kind, generally in the form of a roller, including for example a shaft 36, a body 38, and a plurality of fingers, or flail members 39. The purpose of the reel 34 is to control the movement of the crop plants into the sickle or cutter 28, and subsequent movements into and through the harvester, including their movements through the crusher rollers 30, 32.

The reel or feed mechanism 34 is mounted for essentially vertical movement into different positions, each position being preselected according to certain conditions or factors relating to the crop to be cut, as will be referred to again hereinbelow. The reel 34 additionally can be controlled as to whether it is driven, braked, or free-wheeling in any of its positions of vertical adjustment, according to the features of the present invention which also will be referred to again hereinbelow.

The reel 34 is mounted in the lower ends of laterally spaced downwardly extending arms 40 which are connected with upper positioned arms 42, extending generally horizontally, but not necessarily always horizontal, the latter arms being pivoted for limited vertical swinging movement about an axis 44. The arms 40 may be rigidly connected with the arms 42.

The reel 34 is driven through a train of driving elements, here identified in reverse order, a belt 46 trained on a pulley 48 on the reel, and a pulley 50 mounted on one of the arms 42. A belt tightener 52' may be provided for controlling the belt 46. The pulley 50 is mounted for conjoint movement with another pulley 52 upon which is trained a belt 54, this belt also being trained on another pulley 56 co-axial with the axis 44. Cooperating with the belt 54 is a belt tightener 58 having special functions as will be referred to below. The pulley 56 is part of an assembly which includes a wheel 60, arranged for conjoint movement therewith, the wheel being in frictional engagement with another belt 62 which is trained on a pulley 64, and pulleys 66 and 68 on the crusher rollers 30, 32 respectively. In this case also tighteners 70, 72 may be provided for controlling the belt 62. The pulley 64 is mounted on a shaft 76', fixed on the frame.

Upon movement of the arms 40 vertically, as will be referred to again hereinbelow, the reel 34 is moved vertically, it being moved into different vertical positions relative to the sickle or cutter 28 according to the condition of the crop plants being cut, as to whether they are thick, sparse, tall, short, etc., these various conditions being known to the users of such forage harvesters. The means for vertically adjusting the arms 42 is best shown in FIG. 2 and includes a mechanism indicated generally at 74 which in its entirety is disclosed and described in the copending application identified above. Briefly, the mechanism 74 includes a cam 76, pivoted on a shaft 78 in a lever 80 and the arm 42 (see also FIG. 3). Associated with the cam 76 is a ratchet wheel 81, controlled by a spring pressed pawl 82 and associated with the cam 76 is a detent 82′ having a roller 84 engageable in the pockets between the lobes of the cam. The lobes of the cam are of course of different heights, or radial extent, and upon actuation of the lever arm 80 successively in the direction of the pull thereof, as by the pull cord 86 which is actuated by the operator of the vehicle, the cam, being mounted on the arm 42, raises the arm, or lowers it according to which of the lobes become active according to the position of the cam. The cam is put in different positions according to the number of actuations of the arm 80, so that it may be positioned in for example position No. 1, position No. 2, position No. 3, etc., according to the number of lobes in the cam. Regardless of the position of this cam, and of the reel, the condition of operation of the reel is controlled by apparatus to be described hereinbelow, i.e., the reel can be conditioned for driving, braking, or free-wheeling.

Figure 5:
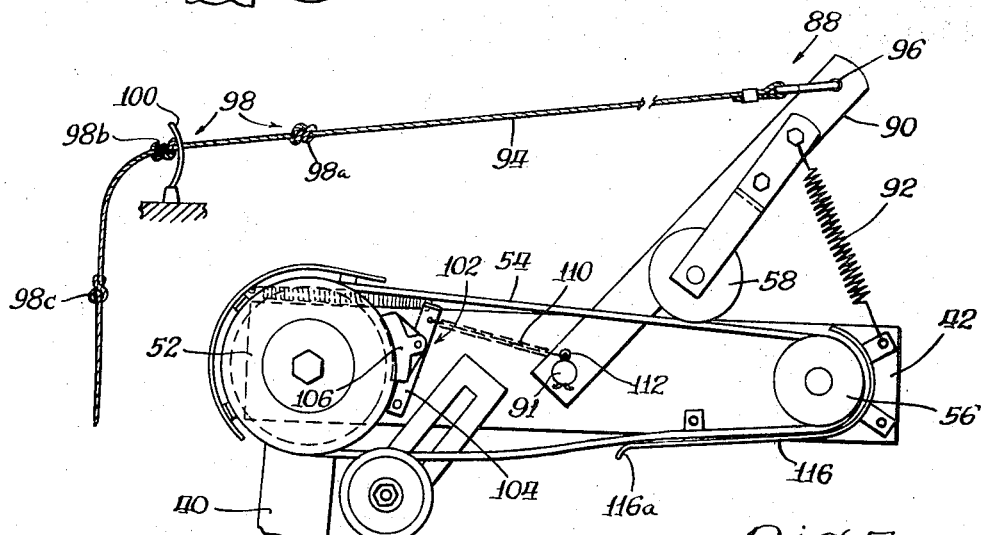
FIG. 5 is a view similar to FIG. 4 but showing the various elements in different positions.
Figure 6:
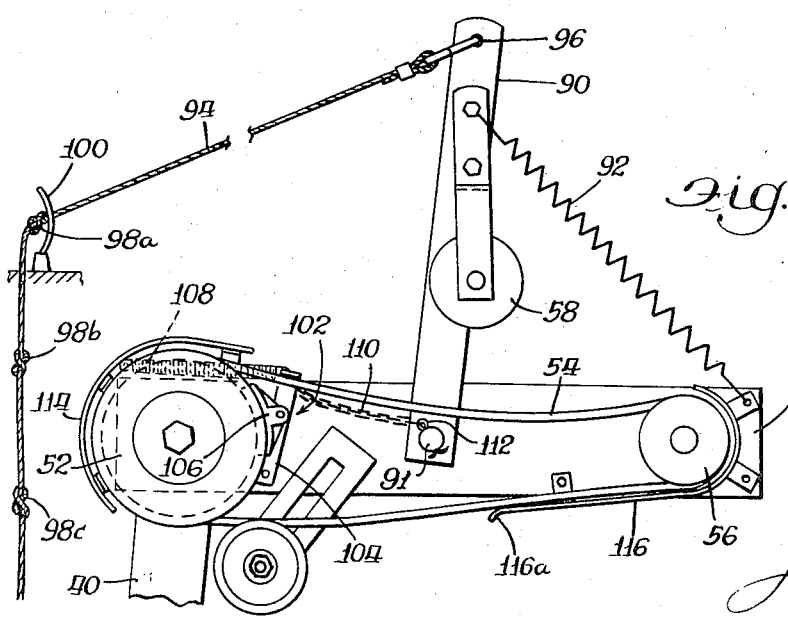
FIG. 6 is a view similar to FIGS. 4 and 5 showing the various elements in still another position.

As noted above, the pulley 56 is mounted on the axis 44 and upon vertical swinging movement of the arms 42 about that axis, the belt 54 of course retains the same relation to the pulley 52. The means for controlling the driving and braking of the reel 34 is shown in FIGS. 4, 5 and 6 and is indicated generally at 88, this means in its entirety being carried by the arms 42. These figures show the uppermost portion of FIG. 1 and particularly that portion having to do with the different positions of the arms 42. Briefly in FIG. 4, the drive relation is established and the brake is in released condition; in FIG. 5, the drive relationship is in neutral and the brake is disengaged; in FIG. 6 the drive relationship is disestablished and the brake is applied.

Referring more specifically to FIGS. 4, 5 and 6, the control mechanism 88 includes a lever arm 90 pivoted at 91 on the arm 42 and carrying the belt tightener pulley 58. The lever arm 90 is biased to retracted position, that of FIG. 4, by a tension spring 92.

Secured to the outer swinging end of the lever arm 90, is a pull rope 94 secured at 96 to the lever, and having three knots 98 individually identified as 98a, 98b and 98c, selectively engageable with a holder 100 at the operator's station. The rope 94 is designed for positioning the lever arm 90 in each of three different positions, the holder 100 being adapted for selective engagement by the knots individually for positioning the rope, and the lever arm, in each of those three different positions.

Mounted on the arm 42, in association with the pulley 52 is a brake mechanism indicated in its entirety at 102, which includes a lever 104 carried by and pivoted directly on the arm 42. Pivotally mounted on this lever is a brake shoe 106 applicable to the pulley 52, the lever being biased in braking direction by a tension spring 108. Connected with the lever 104 is a tie element 110 which is also connected with an element 112 which may serve as a cotter key in the pivotal mounting of the lever arm 90. The connection between that cotter key and the element 110 is such that upon swinging of the arm 90, the brake arm 104 is moved an appropriate extent for positioning it in braking, or non-braking, position as desired. In FIG. 4, in which the control arm 90 is in retracted position, the brake is moved out of braking position, and the tightener 58 engages the belt 54 and produces driving condition.

In FIG. 5, the control arm 90 is in an intermediate position in which the belt tightener 58 is out of operative position, and the belt slips relative to the pulley 52. In this position also, the brake means 102 is in non-braking position, and therefore there is neither driving nor braking, the reel in this case being free wheeling and moving or rotating according to external influences, namely the effect of the crop plants moving thereby.

In FIG. 6, the lever arm 90 is in a third position, in which the tightener 58 is out of engagement with the belt 54 and the belt out of driving condition. Also the cotter key 112 is moved into such a full upper position that the element 110 is fully relaxed, enabling the brake to be applied to the pulley 52 under the action of the tension spring 108.

The reel 34 is positioned vertically as desired, according to the conditions of the crop being harvested, and since the control means 88 is carried entirely by the arm 42, in any vertical position of the reel 34, it can be rendered driving, braking, or free-wheeling, independently of the position of the reel.

Another aspect of the invention is the control of the belt 54 represented in FIGS. 4, 5 and 6. In the nondriving condition there is of course a tendency for the belt to drift because of its slipping relation to the pulleys. In order to provide full and complete control of the belt, guards or shields 114, 116 are provided, the former encircling a substantial portion of the pulley 52, while the latter encircles a substantial portion of the pulley 56 and includes a portion 116a extending under and positioned closely adjacent the lower run of the belt. These guards are spaced a small distance from the respective encircling portions of the belt, at position 116b for example, such as in the neighborhood of ⅛″ to ³⁄₁₆″, and on the lower power run, as at position 116c, on the order of ¼″ to ⅜″ so that the belt may have free run and whipping motion throughout its travel around the pulleys, within the confining effects of the guards, within a wide range which enables the belt to follow through its whipping motion, but still without undue or excessive dragging effect which may impede the free travel and effective operation of the belt.

We claim:

1. In a mowing apparatus having a cutter for cutting crop plants, and a rotatable reel located adjacent a forward portion of the cutter, the combination comprising, first means for adjustably positioning the reel vertically and second means for controlling the rotation of the reel in any vertical position of the reel and means for selectively braking the reel.

2. The invention set out in claim 1 wherein the second means is operative for selectively drivingly rotating the reel in any vertical position of the reel.

3. The invention set out in claim 1 wherein the second means includes the means for selectively braking the reel in any vertical position of the reel.

4. The invention set out in claim 1 wherein the apparatus includes a frame, means carried by the frame for mounting the reel and movable relatively to the frame for positioning the reel in any vertical position, the first means for positioning the reel reacting between the reel mounting means and the frame and the second means for controlling the rotation of the reel being carried by the reel mounting means.

5. The invention set out in claim 4 wherein the reel mounting means includes an arm pivoted on a horizontal axis and carrying the reel on its swinging end, drive transmitting means being carried on the swinging end of the arm, and the second means includes driving means and said braking means operable through said drive transmitting means.

6. The invention set out in claim 5 wherein the drive transmitting means includes a pulley on the swinging end of the arm, and the second means includes a pulley coaxial with said axis and a belt trained on the pulleys.

7. The invention set out in claim 6 and including belt guards surrounding portions of the pulleys and at least one having a relatively straight portion extending under a straight run of the belt, the guards being spaced approximately ⅛″ to ³⁄₁₆″ from a curved portion of the belt on a pulley and being spaced approximately ¼″ to ⅜″ from the lower power run of the belt.

8. The invention set out in claim 1 and including a lever arm in each the first means and the second means, and manually actuatable means secured to each lever arm and extending to a distance for actuation by an operator.

9. In a crop harvesting apparatus having a cutter for cutting crop plants, and a rotatable reel located adjacent a forward portion of the cutter, the combination comprising, an arm pivoted on a horizontal axis and carrying the reel on its swinging end, and a first pulley adjacent its swinging end, means operatively interconnecting said pulley and reel, a second pulley mounted co-axial with said axis, a belt interconnecting said pulleys, a first lever mounted on and carried by the arm, a belt tightener carried by the first lever, the first lever being movable for moving the belt tightener into and out of operative engagement with the belt, a second lever mounted on the arm, a cam operatively associated with the second lever and reactable with a fixed element of the apparatus, the second lever being operative upon movement thereof for actuating said cam and thereby adjustably vertically positioning the arm.

10. The invention set out in claim 9 and including brake means carried by said arm and operatively engageable with one of said pulleys, and means interconnecting the first lever and brake means and operative for controlling the engagement of the brake with the pulley in response to movement of the first lever.

11. The invention set out in claim 10 wherein the first lever is movable to a first position in which the belt tightener is in operative position and the brake means is in inoperative position, a second position in which the belt tightener is in inoperative position and the brake means is in inoperative position, and a third position in which the belt tightener is in inoperative position and the brake means is in operative position.

12. In a mowing apparatus having a cutter for cutting crop plants, and a rotatable reel located adjacent a forward portion of the cutter, the combination comprising, first means for adjustably positioning the reel vertically and second means independent of the first means for controlling the rotation of the reel in any vertical position of the reel and means operative for selectively conditioning the reel for free wheeling of the reel.

References Cited
UNITED STATES PATENTS

| | | | |
|---|---|---|---|
| 2,281,059 | 4/1942 | Anderson et al. | 56—23 |
| 2,395,672 | 2/1946 | Kranick et al. | 56—23 |
| 3,300,953 | 1/1967 | Glass | 56—23 |

LOUIS G. MANCENE, Primary Examiner

JAMES A. OLIFF, Assistant Examiner

U.S. Cl. X.R.

56—156, 208